Patented June 10, 1952

2,600,018

UNITED STATES PATENT OFFICE 2,600,018

PORTLAND CEMENT BASE PAINTS

Clare R. Nelson and Ralph E. Madison, Detroit, Mich., assignors to Truscon Laboratories, Inc., Hamtramck, Mich., a corporation of Michigan No Drawing. Application March 27, 1950, Serial No. 152,262

6 Claims. (Cl. 106—93)

This invention relates to improvements in Portland cement base paints and more particularly a Portland cement base paint in dry powder form containing a small amount of methyl cellulose in powder form.

Among the objects of the invention are the provision of Portland cement base paints of improved brushing characteristics even over dry surfaces, which do not require dampening or wetting of the surfaces over which the paints are applied, and which will cure or harden without further application of water to the applied films. Other objects of the invention will appear from the following description.

It is well known that Portland cement can be used as a base for certain types of paints, such paints or compositions usually being supplied in dry or powder form and being capable of transformation on the addition of water into liquid form. In this latter state they may be applied by brush or spray or other means to surfaces of masonry, brick, concrete, etc. These compositions in their liquid form can be used to decorate or color surfaces of masonry, etc. and in certain cases, through inclusion of water repellent materials, can be used to provide resistance against the passage of water through a porous masonry base.

It is, however, well known that such paints have certain disadvantages which limit their usefulness. Thus, when application is made to porous masonry or concrete surfaces it is necessary that the surfaces be thoroughly dampened with water immediately before application, to avoid undue loss of water by absorption by the masonry surface; otherwise the water in the paint is rapidly adsorbed by the porous masonry during the brushing of the paints over the masonry with resulting thickening of the paint under the brush so as to cause uneven and unsightly coating. It is also necessary to prevent rapid loss of water from the paint to insure that sufficient water is present for the necessary hydration and setting of the cement. If water is too rapidly drawn from the paint by the masonry, hydration cannot take place and a non-adherent, powdery deposit will be formed. It is also necessary to prevent undue loss of water by evaporation from the surface of the paint after application and a further application of water, e. g., in the form of a fine mist, may be necessary to prevent such loss of water.

The present invention provides improved Portland cement base paint compositions which largely overcome the limitations and disadvantages above mentioned.

The new paints of the present invention have greatly improved brushing characteristics even over dry surfaces and do not require dampening of the surfaces over which the paints are applied nor the subsequent application of water to the exposed surfaces of the paints after application to insure curing or hardening of the paints. The new paint compositions are particularly valuable for use in the coating of dry porous surfaces, such as masonry, brick, concrete, etc., porous fiber-board material such as Celotex and fiber-glass insulation batts or blocks, etc. The new paints are not, however, limited in their application to such dry porous surfaces. They can also be applied to other surfaces such as glazed brick, building tile, stone and other masonry materials presenting rather dense and less porous surfaces, and with lessening of the tendency for "crawling" or "breaking" during application to smooth, dense surfaces.

The present invention is based upon the discovery that by converting fibrous methyl cellulose to powder form and adding small amounts of powdered methyl cellulose to the dry compositions used in making Portland cement base paints, paint compositions are obtained which are particularly valuable and advantageous for use in painting porous surfaces or masonry or insulating board or dense masonry surfaces. We have found that if a small amount of methyl cellulose in powder form is added to the paint composition in dry or powder form and then made into a liquid form with water the resulting paint has greatly improved brushing characteristics, even over dry surfaces, and will retain the water when the paint is applied, without objectionable or excessive loss of water from the paint either by absorption in dry or porous surfaces or by surface evaporation.

The dry paint compositions used in making the new paints may be such as are now commonly used in making Portland cement base paints. Such dry powders are commonly made up by mixing white Portland cement as the principal constituent with relatively smaller and varying amounts of other materials such as sand, alkali resisting coloring materials or pigments, such as chromium oxide, iron oxides, ochres, etc. for producing various colors or shades, calcium chloride, etc. The sand however can be varied widely in amount and in coarseness depending upon the mass and the texture desired, white or light colored grades being usually selected where a white final color is desired. Calcium chloride in small amount, if included in the composition, acts to accelerate the setting of the Portland cement. Sometimes hydrated lime is included in the composition.

The methyl cellulose used in small amount to add to such dry compositions is methyl cellulose in powder form, and in amounts which are relatively small and which will vary somewhat with different compositions and with the particular methyl cellulose used, e. g., between about 0.5% and 5% by weight of the powdered methyl cellulose on the dry Portland cement composition to which the methyl cellulose is added.

Methyl cellulose in fibrous form is not satisfactory for use in dry Portland cement base paints, but by converting it into a granular or powdered form in a pebble mill or a steel ball mill it can then be advantageously admixed with a dry Portland cement base paint to form a homogeneous mixture. The powder is advantageously of a fineness which for the most part passes through a 50-mesh screen. It should be fine enough to allow it to be homogeneously mixed with the other ingredients but not too large to consume an impractical length of time to dissolve it when the paint is mixed for use. Methyl cellulose is produced in different grades and with different viscosities. A 2% water solution of a low viscosity methyl cellulose may thus have a viscosity of 15 to 25 centipoises; a 2% water solution of a medium viscosity methyl cellulose, a viscosity of 100 to 400 centipoises; and a 2% water solution of a high viscosity methyl cellulose, a viscosity of 1500 to 4000 centipoises.

The amount of methyl cellulose used will vary somewhat with the type of methyl cellulose and its properties, such as its viscosity and solubility. The amount of methyl cellulose used will thus depend somewhat on the viscosity type, and the amount of mixing water to give the desired properties of brushing, "hold-out" thickness of applied film, etc.

In general, amounts of methyl cellulose of 1 to 2.5% of the weight of the dry Portland cement base are preferred, although amounts of methyl cellulose of about 0.5% to 5% of the weight of the dry Portland cement base may be used. However, if too much methyl cellulose is used a point may be reached where the workability of the paint is seriously lessened; while if too little methyl cellulose is used the paint may not have the desired workability and characteristics of holding the water in the paint layer at the surface to be coated.

The amount of water used in making the paint compositions can also be varied, but in general will be regulated to avoid too little water with resulting lack of workability or too much water which will interfere with the application and hydrating and hiding properties of the paint. The amount of water can be varied considerably, depending on the covering power desired, the color to be used, and the surface to be treated. The optimum amount of water is in general around 52 to 75% by weight of the dry composition. The amount of methyl cellulose used will be somewhat dependent on the amount of mixing water used in converting the dry composition into a paint, as well as the viscosity characteristics of the methyl cellulose material used.

The invention will be further illustrated by the following examples, but it will be understood that the invention is not limited thereto:

*Example I*

A dry cement base paint composition is made of the following ingredients, the parts being by weight:

| | Parts |
|---|---|
| White Portland cement | 82 |
| Methyl cellulose (low viscosity) | 1.0–2.5 |
| Silica sand (200 mesh) | 5.0 |
| Calcium chloride | 5.0 |
| Titanium-barium pigment | 8.0 |

In making this composition the methyl cellulose in a powdered or granular form is mixed with the other ingredients in a mixer suitable for mixing dry powders. This dry composition can be stored and shipped, and formed into a liquid paint by the addition of water at the time of use.

In applying this dry composition it may be added slowly with constant stirring to water, e. g., in the proportions of 10 pounds of the composition to 2½ quarts of water, and with continuation of the stirring until the methyl cellulose is dissolved.

Except for the added methyl cellulose, the composition of the above example is a typical cement base paint composition such as has heretofore been used. A sample of such composition was made without the addition of the methyl cellulose and a paint composition made by adding 10 pounds of the dry composition slowly with constant stirring to 2½ quarts of water.

When these two liquid paints are compared there is not much difference in appearance except that the paint of the above examples showed a slightly more creamy consistency. When the paint made without the methyl cellulose was used by dipping a paint brush in it and applying it to a dry concrete wall surface, there was immediately noticed a "drying-out" under the brush which was so serious that a smooth application was not possible and it was soon recognized that the material could not be brushed on but had to be more or less troweled on, using the brush as a kind of paddle to scoop up and apply the material. On the other hand, the paint of the above example, containing methyl cellulose, when applied with a brush compared very favorably with good grade oleoresinous flat wall paints. Smooth, uniform films can be applied of the new paint of the above example with no tendency for "pulling" or "drying-out" under the brush.

The applications thus made of the two compositions to dry concrete wall surfaces were allowed to dry or "cure" for 18 to 24 hours at the end of which time it was noticed that the coating made with the paint which did not contain methyl cellulose was powdery and almost totally non-adherent to the concrete base; while the paint of the above example, containing the methyl cellulose, gave a firm and dense coating which could be removed only with difficulty from the concrete base.

Further applications were made of the two paints to porous fiber-board materials such as Celotex, and to fiber-glass insulation, batts or blocks. The paint without the methyl cellulose was observed to be so adversely affected by the porous nature of the two bases that it almost disappeared from the surface by penetration into the base. On the other hand, the paint of the above example, containing methyl cellulose, was found to brush exceedingly well on the same surfaces; it did not disappear into the pores of the base and in fact formed a film which at the expiration of 24 hours was firm and dense and tightly adherent.

In making the dry composition of the above example, the methyl cellulose in powdered or granulated form is admixed with the other ingredients so that the dry composition can be used merely by adding it to water in proper amount to form the paint composition for application, or vice versa.

*Example II*

A dry composition is made of the following materials in the following proportions by weight:

| | Parts |
|---|---|
| White Portland Cement | 82 |
| Methyl cellulose (low viscosity) | 1.0–2.5 |
| Aluminum stearate | 0.5 |
| Calcium chloride | 5.0 |
| Hydrated lime | 9.0 |
| Titanium dioxide | 3.5 |

This dry composition can similarly be shipped and stored and used by admixing it with water in suitable proportions to form a paint, and gives a paint composition having similar properties and advantages to those referred to in connection with Example I.

Variations can be made in the formulas, as illustrated by the above examples. The amount of methyl cellulose used can be varied somewhat depending on the viscosity characteristics of the material used and also on the amount of mixing water used.

If too much methyl cellulose is used a point may be reached where workability is seriously lessened; while if too little methyl cellulose is used there will be but little value in producing workability or in providing the characteristics of "holding" the water at the surface to be coated. Similarly if too little water is used there will also be lack of workability, while if too much is used the hydrating properties may be destroyed as well as the ability of the paint to color or "hide." The optimum amount of water is around 52-75% by weight of the dry composition, but this can be varied considerably depending on the covering power desired, the color to be used, and the surface to be treated.

While the amount of low viscosity methyl cellulose as shown by the above examples appears to be an optimum amount for the particular methyl cellulose used, variations can be made in the amount as well as in the particular water-soluble cellulose ether used, depending, e. g., on its viscosity characteristics, it being necessary only to balance the type and appropriate amount and the amount of mixing water to give the desired properties of brushing, "hold out," thickness of applied film, etc. Viscosity types of methyl cellulose other than those above referred to can be used, or mixtures of various types, and compositions of somewhat varying properties can be obtained by their use.

Different kinds of Portland cement can be used in making the new paint compositions, including ordinary Portland cement and particularly white Portland cement where a white paint is desired. Other types of Portland cement including high alumina quick-drying cements can also be used. Various alkali resistant coloring materials or pigments as well as more or less coarse sand, etc. can be used depending on the texture desired. Calcium chloride in regulated amount accelerates the setting of the Portland cement. Calcium chloride, if included, should not be so great in amount as to cause too rapid acceleration of the hardening or setting of the cement. The amount of hydrated lime used can also be widely varied.

Where, however, Portland cement is used in substantial amount, and even though a relatively large amount of lime may also be present, the addition of the methyl cellulose gives a paint with enhanced brushing qualities although the setting qualities of the concrete may be somewhat reduced by the presence of the lime.

The new dry paint compositions can be readily prepared by simple admixture of the ingredients and shipped and stored and are ready for use by admixing them with water in suitable amount to form the paint compositions.

The new paint compositions ready for application can be readily prepared from the dry compositions containing the methyl cellulose and other common cement base paint constituents.

The new paint compositions containing small amounts of methyl cellulose are valuable paint compositions, having greatly improved brushing characteristics even over dry surfaces, and being applicable to dry and porous surfaces without requiring prewetting of the surfaces before applying the paints and without requiring further application of water to the surface of the paint to insure setting and hardening. And even where the surfaces to be painted are not porous the new paint compositions give improved results with lessening of the tendency of the paint layer to crawl or break during application to smooth, dense surfaces.

This application is a continuation in part of our prior application Serial No. 649,396, filed February 21, 1946, now abandoned.

We claim:

1. A dry Portland cement base paint composition in powder form containing a small amount of methyl cellulose in powder form.

2. A Portland cement base paint composition in dry powder form containing methyl cellulose in powder form in the proportions of about 0.5% to 5.0% by weight of the solid constituents of the composition.

3. A Portland cement base paint composition in the form of a dry mixture containing Portland cement as its principal ingredient and also containing about 1.0% to 2.5% of methyl cellulose in powder form.

4. A dry Portland cement base paint composition in powder form containing a small amount of methyl cellulose in powder form, the major portion of the powdered methyl cellulose being of a size to pass a 50-mesh screen.

5. A Portland cement base paint composition in dry powder form containing methyl cellulose in powder form in the proportions of about 0.5% to 5.0% by weight of the solid constituents of the composition, the major portion of the powdered methyl cellulose being of a size to pass a 50-mesh screen.

6. A Portland cement base paint composition in the form of a dry mixture containing Portland cement, and also containing from about 1.0% to 2.5% of methyl cellulose in powder form, the Portland cement comprising the major portion of the composition and the major portion of the powdered methyl cellulose being of a size to pass a 50-mesh screen.

CLARE R. NELSON.
RALPH E. MADISON.

REFERENCES CITED

The following references are of record in the file of this patent:

UNITED STATES PATENTS

| Number | Name | Date |
|---|---|---|
| 1,978,141 | Moross | Oct. 23, 1934 |
| 2,246,620 | Comeau | June 24, 1941 |
| 2,432,971 | Ruthman | Dec. 16, 1947 |
| 2,476,306 | King | July 19, 1949 |

FOREIGN PATENTS

| Number | Country | Date |
|---|---|---|
| 26,094/30 | Australia | 1931 |